US008163320B2

(12) United States Patent
Braun et al.

(10) Patent No.: US 8,163,320 B2
(45) Date of Patent: Apr. 24, 2012

(54) STABILISER SYSTEM FOR LIQUID NUTRITIONAL COMPOSITIONS

(75) Inventors: Marcel Braun, Konolfingen (CH); Olivier Guy Philippe Robin, Vevey (CH); Marc Thierry Frauchiger, Bern (CH); Reinhard Behringer, Oberdiessbach (CH); Fred Neumann, Steffisburg (CH)

(73) Assignee: Nestec S.A., Vevey (CH)

( * ) Notice: Subject to any disclaimer, the term of this patent is extended or adjusted under 35 U.S.C. 154(b) by 486 days.

(21) Appl. No.: 12/373,423

(22) PCT Filed: Jul. 11, 2007

(86) PCT No.: PCT/EP2007/057098
§ 371 (c)(1),
(2), (4) Date: Jan. 12, 2009

(87) PCT Pub. No.: WO2008/006849
PCT Pub. Date: Jan. 17, 2008

(65) Prior Publication Data
US 2009/0246337 A1    Oct. 1, 2009

(30) Foreign Application Priority Data
Jul. 13, 2006   (EP) .................................... 06117085

(51) Int. Cl.
*A23L 2/38*    (2006.01)

(52) U.S. Cl. ...................... 426/330.3; 426/654; 426/590
(58) Field of Classification Search ............... 426/330.3, 426/654, 590
See application file for complete search history.

(56) References Cited

U.S. PATENT DOCUMENTS

| 4,045,589 A | 8/1977 | Petrowski et al. |
| 5,291,877 A | 3/1994 | Conde-Petit et al. |

FOREIGN PATENT DOCUMENTS

| EP | 1137396 | 10/2001 |
| EP | 1225809 | 7/2002 |
| GB | 1493317 | 11/1977 |
| WO | 9956563 | 11/1999 |
| WO | 2005053414 | 6/2005 |

OTHER PUBLICATIONS

International Search Report for PCT/EP2007/057098 mailed on Nov. 7, 2007.
Written Opinion for PCT/EP2007/057098 mailed on Nov. 7, 2007.

*Primary Examiner* — Anthony Weier
(74) *Attorney, Agent, or Firm* — K&L Gates LLP

(57) ABSTRACT

A liquid nutritional composition includes partially hydrolysed protein, fat and from 0.1 to 10 grams per liter of an emulsifier with a hydrophilic lipophilic balance value of less than 5, from 0.1 to 10 grams per liter of an emulsifier with a hydrophilic lipophilic balance value of more than 5 and from 0.01 to 20 grams per liter of a low amylose starch is shown.

12 Claims, No Drawings

STABILISER SYSTEM FOR LIQUID NUTRITIONAL COMPOSITIONS

FIELD OF THE INVENTION

This invention relates to a stabiliser system for liquid nutritional compositions, a method for stabilising liquid nutritional products and to liquid nutritional products so stabilised.

BACKGROUND OF THE INVENTION

Nutritional products such as infant formula and compositions designed to provide enteral nutritional support to patients in a hospital, other health care settings or, indeed, at home are well known. Some of these products, including infant formula, are designed to provide all necessary nutrients whilst others can also be used as supplements to a normal diet. Of known enteral nutritional compositions, some are directed to specific disease states whilst other products are more generic and broad based for providing nutritional support to patients who cannot obtain necessary nutrients through traditional means of eating food. In general, however, such nutritional products will contain all three macronutrients protein, fat and carbohydrate as well as micronutrients such as vitamins, minerals, trace elements and other components in accordance with the intended use of the composition.

For example, certain populations may require increased protein levels. Likewise, certain populations may require hydrolysed or non intact protein. For example, infants with established cows' milk allergy should only be fed formulas in which the cows' milk proteins have been extensively hydrolysed (for example degree of hydrolysis 28%). Another example of a population where hydrolysed proteins are indicated is patients with impaired gastrointestinal tolerance such as may be associated with conditions such as pancreatitis and short bowel syndrome for example as well as patients resuming enteral feeding after a period of total parenteral nutrition.

Such nutritional products may be supplied as powders for reconstitution with water immediately prior to consumption. Alternatively, they may be supplied in liquid form ready for immediate consumption or administration. A problem that may be encountered when nutritional products are supplied in liquid form is a tendency to phase separation over time. Thus, whilst the manufacturing process results in a homogeneous emulsion, if the product is stored for any length of time before being used, it may start to separate into aqueous and non-aqueous phases and present a "curdled" (volume of clear serum topped by a distinct "creamy" phase) to the consumer or care-giver responsible for administration of the product. In general, this phenomenon does not adversely affect the nutritional quality or efficacy of the product but it may create an adverse impression in the minds of some consumers regarding the product's quality and acceptability.

This problem of phase separation is exacerbated by the use of certain ingredients such as hydrolysed proteins and egg phospholipids as well as by the heat treatments which are necessary to ensure the sterility of the products after manufacturing.

Various stabilisers and stabiliser systems have been proposed to address this problem. For example, in EP 1225809, it is proposed to use a stabiliser system comprising high amylose starch and guar gum.

There is however a continuing need to improve the stability of liquid nutritional compositions, particularly those containing partially hydrolysed protein and fat.

SUMMARY OF THE INVENTION

The present inventors have surprisingly found that a specific combination of emulsifiers with a low amylose starch forms a particularly effective stabiliser system for liquid nutritional compositions.

Accordingly, the present invention provides a liquid nutritional composition comprising partially hydrolysed protein, fat and from 0.1 to 10 grams/liter of an emulsifier with a hydrophilic lipophilic balance value of less than 5, from 0.1 to 10 grams/liter of an emulsifier with a hydrophilic lipophilic balance value of more than 5 and from 0.01 to 20 grams/liter of a low amylose starch.

The invention extends to a method for stabilising a liquid nutritional composition including partially hydrolysed protein and fat, comprising the steps of including in the composition from 0.1 to 10 grams/liter of an emulsifier with a hydrophilic lipophilic balance value of less than 5, from 0.1 to 10 grams/liter of an emulsifier with a hydrophilic lipophilic balance value of more than 5 and from 0.01 to 20 grams/liter of a low amylose starch.

Without wishing to be bound by theory, the inventors believe it is possible that the combination of a hydrophobic emulsifier with a hydrophilic emulsifier and a material with a weak ability to form a gel interacts to provide an effective stabiliser system for liquid nutritional compositions containing partially hydrolysed protein and fat.

DETAILED DESCRIPTION OF THE INVENTION

In this specification, the following terms have the following meanings:—

"HLB" in the context of an emulsifier means the hydrophilic lipophilic balance of that emulsifier;

"low amylose starch" means a starch having an amylose content of 50% or less, preferably 30% or less;

"partially hydrolysed protein" means protein that has been subjected to hydrolysis to yield a mixture of peptides possibly also including free amino acids;

"stabiliser system for a liquid nutritional composition" means a combination of a hydrophobic emulsifier with a hydrophilic emulsifier and a low amylose starch irrespective of whether or not these compounds are added to the liquid nutritional composition as a combination or separately.

All references to percentages are percentages by weight unless otherwise stated.

A liquid nutritional composition according to the invention comprises from 0.1 to 10 g/l of a emulsifier with an HLB value less than 5 As is well known to those skilled in the art, such an emulsifier may also be described as a hydrophobic emulsifier. Preferably, the hydrophobic emulsifier content is between 1 and 3 g/l. Suitable hydrophobic emulsifiers include fatty acid mono- and diglycerides. A particularly preferred hydrophobic emulsifier is the fatty acid monoglyceride sold under the trade mark DIMODAN P® by Danisco.

A liquid nutritional composition according to the invention also includes from 0.1 to 10 g/l of a hydrophilic emulsifier with an HLB value greater than 5. As is well known to those skilled in the art, such an emulsifier may also be described as a hydrophilic emulsifier. Preferably, the hydrophilic emulsifier content is between 1 and 3 g/l. Suitable hydrophilic emulsifiers include citric acid esters of mono- and/or diglycerides, diacetyl tartaric acid esters of mono- and/or diglycerides and lecithin. Particularly preferred hydrophilic emulsifiers are the citric acid ester of monoglycerides sold under the trade mark CITREM LR-10® by Danisco and the lecithin sold under the trade mark Topcithin® by Cargill, Minneapolis, USA.

A liquid nutritional composition according to the invention further includes from 0.01 to 20 g/l of a low amylose starch. Preferably the starch content is between 2 and 10 g/l. Suitable low amylose starches include those obtained from substances such as potato, corn, wheat, barley, tapioca or rice for example. Modified starches such as sodium octenyl succinate starch, oxidized starch, monostarch phosphate, distarch phosphate, phosphated distarch phosphate, acetylated distarch phosphate, acetylated starch, acetylated distarch adipate and acetylated oxidized starch may also be used provided they meet the criterion of having an amylose content of less than 50%. Preferred starches are potato starch such as that sold under the trade mark Pregeflow P 100® by Roquette, Lestrem, France and low amylose corn starch such as that sold under the trade mark Maisita® by Agrana, Austria.

Preferably the relative proportions of the two emulsifiers and the low amylose starch are from 5 to 75% by weight of the emulsifier with a HLB of less than 5, from 5 to 75% of the emulsifier with a HLB value of more than 5 and from 10 to 80% of the low amylose starch. In general, the amounts of the two emulsifiers may be comparable and preferably there is the same amount of each emulsifier.

The stabiliser system comprising the two emulsifiers and the low amylose starch may be added to the liquid nutritional composition in an amount of from 0.21 to 30 grams per liter of composition, more preferably from 4 to 16 g/l.

The liquid nutritional composition contains partially hydrolysed protein. The type of protein is not critical and may be hydrolysed whey, casein or soy for example. Mixtures of different partially hydrolysed proteins may also be used. The degree of hydrolysis is likewise not critical and may vary between 15% and 28% for example. The liquid nutritional composition may also contain other components such as carbohydrates, vitamins, minerals, trace elements and other substances conventionally found in such compositions.

The invention extends to a method of stabilising a liquid nutritional composition including partially hydrolysed protein and fat, comprising the steps of including in the composition from 0.1 to 10 g/l of an emulsifier with a hydrophilic lipophilic balance value of less than 5, from 0.1 to 10 g/l of an emulsifier with a hydrophilic lipophilic balance value of more than 5 and from 0.01 to 20 g/l of a low amylose starch.

The nutritional composition may be prepared in any suitable manner. For example, it may be prepared by blending together the protein, the carbohydrate, and the fat in appropriate proportions. The emulsifiers may be both be added to the fat prior to blending. Alternatively, the hydrophobic emulsifier alone may be added to the fat. Vitamins and minerals may be added at this point but are usually added later to avoid thermal degradation. Any lipophilic vitamins, may be dissolved into the fat source prior to blending. Water, preferably water which has been subjected to reverse osmosis, may then be mixed in to form a liquid mixture. The hydrophilic emulsifier may be added at this point as may the low amylose starch. The temperature of the water is conveniently about 50° C. to about 80° C. to aid dispersal of the ingredients. Commercially available liquefiers may be used to form the liquid mixture. The liquid mixture is then homogenised; for example in two stages.

The liquid mixture may then be thermally treated to reduce bacterial loads, by rapidly heating the liquid mixture to a temperature in the range of about 80° C. to about 150° C. for about 5 seconds to about 5 minutes, for example. This may be carried out by steam injection, autoclave or by heat exchanger; for example a plate heat exchanger.

Then, the liquid mixture may be cooled to about 60° C. to about 85° C.; for example by flash cooling. The liquid mixture may then be again homogenised; for example in two stages at about 10 MPa to about 30 MPa in the first stage and about 2 MPa to about 10 MPa in the second stage. The homogenised mixture may then be further cooled to add any heat sensitive components; such as vitamins and minerals. The pH and solids content of the homogenised mixture are conveniently adjusted at this point.

The homogenised mixture may be aseptically filled into suitable containers by pre-heating the homogenised mixture (for example to about 75 to 85° C.) and then injecting steam into the homogenised mixture to raise the temperature to about 140 to 160° C.; for example at about 150° C. The homogenised mixture may then be cooled, for example by flash cooling, to a temperature of about 75 to 85° C. The mixture may then be homogenised again, further cooled to about room temperature and filled into containers. Suitable apparatus for carrying out aseptic filling of this nature is commercially available.

Alternatively, the homogenised mixture my be filled into suitable containers and the filled containers may be retorted for example by heating at a temperature between 110 and 130° C. for a period of from 3 to 15 minutes.

The invention will now be further described by reference to the following examples.

EXAMPLE 1

Various examples of stabiliser system for use in the method according to the invention are given in Table 1 below. The values which appear first are percentages by weight of the stabiliser system and the values in parentheses are percentages by weight of the liquid composition

TABLE 1

|  | A | B | C | D | E |
|---|---|---|---|---|---|
| Citrem LR10-J | 19% (0.25%) | 19% (0.25%) | 17.5% (0.25%) | 27% (0.25%) |  |
| Dimodan P PEL/B | 19% (0.25%) | 19% (0.25%) | 17.5% (0.25%) | 27% (0.25%) | 19% (0.25%) |
| Topcithin NGM |  |  |  |  | 19% (0.25%) |
| Starch (potato) | 62% (0.84%) |  | 58% (0.84%) | 46% (0.42%) |  |
| Maisita |  | 62% (0.84%) |  |  | 62% (0.84%) |

EXAMPLE 2

The stabiliser systems shown in Table 2 below were used to stabilise a liquid nutritional composition comprising extensively hydrolysed whey protein isolate, fat (40% medium chain triglycerides, 59% vegetable fats, 1% low EPA fish oil) and carbohydrate (88% maltodextrin, 12% potato starch). In each case, aseptically filled and retorted samples of the composition were prepared and stored for 3 months at 20° C. Emulsion stability was then assessed by visual observation. Serum formation was determined by visual estimation of the volume of clear serum and the re-dispersibility of the cream phase was determined by extensive shaking for 3 seconds and immediate visual observation. The results are shown in Table 2

TABLE 2

|  | A | Comparative | B | Comparative | Comparative |
|---|---|---|---|---|---|
| Citrem LR10-J | 19% (0.25%) | 19% (0.25%) | 27% (0.25%) |  | 50% (0.25%) |
| Dimodan P PEL/B | 19% (0.25%) | 19% (0.25%) | 27% (0.25%) | 19% (0.25%) | 50% (0.25%) |
| Topcithin NGM |  |  |  | 19% (0.25%) |  |
| Starch (potato) | 62% (0.84%) |  | 46% (0.42%) |  |  |
| Eurylon 7 |  | 62% (0.84%) |  | 62% (0.84%) |  |
| Quality of emulsion (aseptic) | +++ no oil drops | + no oil drops | +++ oil drops on cream phase | + | --- |
| Quality of emulsion (retort) | ++ no oil drops | + no oil drops | ++ no oil drops | + | --- |

+++ indicates best result

--- indicates worst result

The invention claimed is:

1. A liquid nutritional composition comprising partially hydrolysed protein, fat, from 0.1 to 10 grams per liter of an emulsifier with a hydrophilic lipophilic balance value of less than 5, from 0.1 to 10 grams per liter of an emulsifier with a hydrophilic lipophilic balance value of more than 5, and from 0.01 to 20 grams per liter of a low amylose starch having an amylose content of less than 50% by weight.

2. The composition as claimed in claim 1, wherein the emulsifier with a hydrophilic lipophilic balance value of less than 5 is a fatty acid monoglyceride or a fatty acid diglyceride.

3. The composition as claimed in claim 1 or 2, wherein the emulsifier with a hydrophilic lipophilic balance value of more than 5 is at least one of a citric acid ester of monoglycerides, a citric acid ester of diglycerides, a citric acid ester of monoglycerides and diglycerides, a diacetyl tartaric acid ester of monoglycerides, a diacetyl tartaric acid ester of diglycerides, a diacetyl tartaric acid ester of monoglycerides and diglycerides or lecithin.

4. The composition as claimed in claim 1, wherein the low amylose starch is potato starch or corn starch.

5. The composition as claimed in claim 1, which comprises from 1.0 to 3.0 g/l of an emulsifier with a hydrophilic lipophilic balance value of less than 5.

6. The composition as claimed in claim 1, which comprises from 1.0 to 3.0 g/l of an emulsifier with a hydrophilic lipophilic balance value of more than 5.

7. The composition as claimed in claim 1, which comprises from 2.0 to 10.0 g/l of a low amylose starch.

8. The composition as claimed in claim 1, which contains equal quantities of the emulsifier with a hydrophilic lipophilic balance value of less than 5 and the emulsifier with a hydrophilic lipophilic balance value of more than 5.

9. The composition as claimed in claim 1, which is an infant formula.

10. The method of stabilising a liquid nutritional composition including partially hydrolysed protein and fat, the method comprising adding to the composition from 0.1 to 10 grams per liter of an emulsifier with a hydrophilic lipophilic balance value of less than 5, from 0.1 to 10 grams per liter of an emulsifier with a hydrophilic lipophilic balance value of more than 5, and from 0.01 to 20 grams per liter of a low amylose starch having an amylose content of less than 50% by weight.

11. The composition as claimed in claim 1, wherein the low amylose starch has an amylose content of 30% by weight or less.

12. The method as claimed in claim 10, wherein the low amylose starch has an amylose content of 30% by weight or less.

* * * * *